United States Patent
Satzky et al.

(10) Patent No.: US 8,300,215 B2
(45) Date of Patent: Oct. 30, 2012

(54) OPTICAL SENSOR OPERATING ON THE TRANSIT TIME PRINCIPLE

(75) Inventors: Uwe Satzky, Hamburg (DE); Ernst Tabel, Hamburg (DE)

(73) Assignee: PEPPERL + FUCHS GmbH, Mannheim (DE)

( * ) Notice: Subject to any disclaimer, the term of this patent is extended or adjusted under 35 U.S.C. 154(b) by 153 days.

(21) Appl. No.: 12/748,812

(22) Filed: Mar. 29, 2010

(65) Prior Publication Data
US 2010/0245801 A1   Sep. 30, 2010

(30) Foreign Application Priority Data

Mar. 31, 2009  (EP) .................................... 09004763

(51) Int. Cl.
*G01C 3/08* (2006.01)
(52) U.S. Cl. ......... 356/5.01; 356/4.01; 356/4.1; 356/5.1
(58) Field of Classification Search ........ 356/3.01–28.5, 356/139.01–139.1
See application file for complete search history.

(56) References Cited

U.S. PATENT DOCUMENTS

| | | | |
|---|---|---|---|
| 4,319,332 A | | 3/1982 | Mehnert |
| 5,808,727 A | * | 9/1998 | Katayama .................... 356/4.01 |
| 6,504,602 B1 | * | 1/2003 | Hinderling ..................... 356/5.1 |
| 2005/0158177 A1 | * | 7/2005 | Mehlhorn .................. 417/44.11 |
| 2005/0279914 A1 | | 12/2005 | Dimsdale et al. |

FOREIGN PATENT DOCUMENTS

| | | |
|---|---|---|
| DE | 197 06 612 A1 | 8/1998 |
| DE | 197 32 776 C1 | 2/1999 |
| DE | 101 14 362 A1 | 10/2002 |
| DE | 10 2004 014 041 A1 | 10/2005 |
| EP | 1 378 763 A1 | 1/2004 |

OTHER PUBLICATIONS

Grubl, Alexander, "European Search Report", European Application No. EP 09 00 4763, Sep. 11, 2009, 2 pages.

* cited by examiner

*Primary Examiner* — Luke Ratcliffe
(74) *Attorney, Agent, or Firm* — John A. Merecki; Hoffman Warnick LLC

(57) ABSTRACT

The present invention relates to an optical sensor based on the transit time principle. The sensor includes a light source for the emission of emergent light pulses into an observed region, comprising a rotating device for rotating a beam direction of the emergent light pulses about a rotation axis orientated at right angles to the beam direction, comprising a detector for the detection of light pulses reflected by objects in the observed region, and comprising a control and evaluation unit for controlling the light source, for evaluating the light pulses detected by the detector, and for determining a distance away of an object on the basis of a measured transit time of the light pulses. The optical sensor is characterized in that the rotating device has a rotor and a stator and that the light source, the detector, and an electronic assembly forming part of the control and evaluating unit are disposed for joint rotation on the rotor.

29 Claims, 2 Drawing Sheets

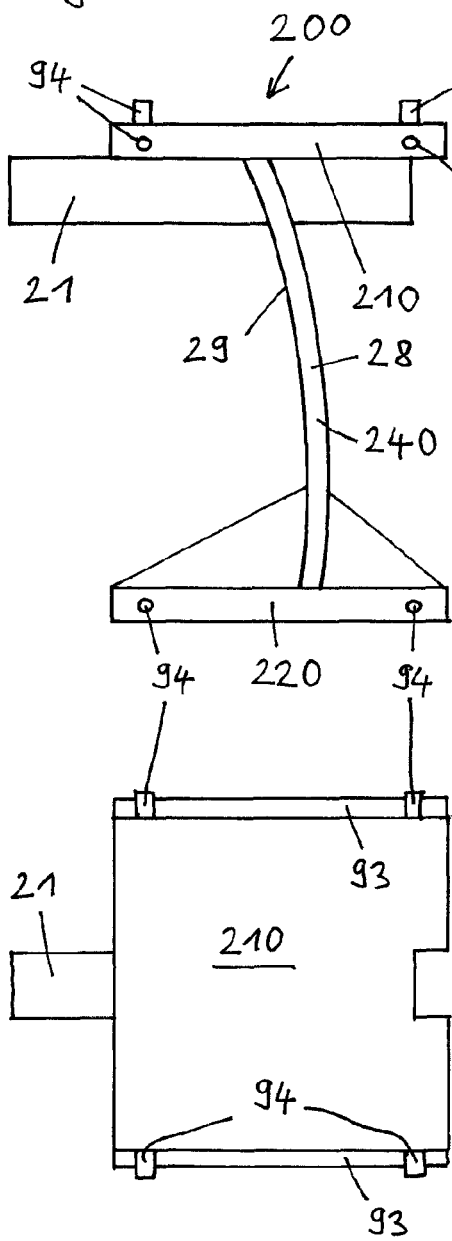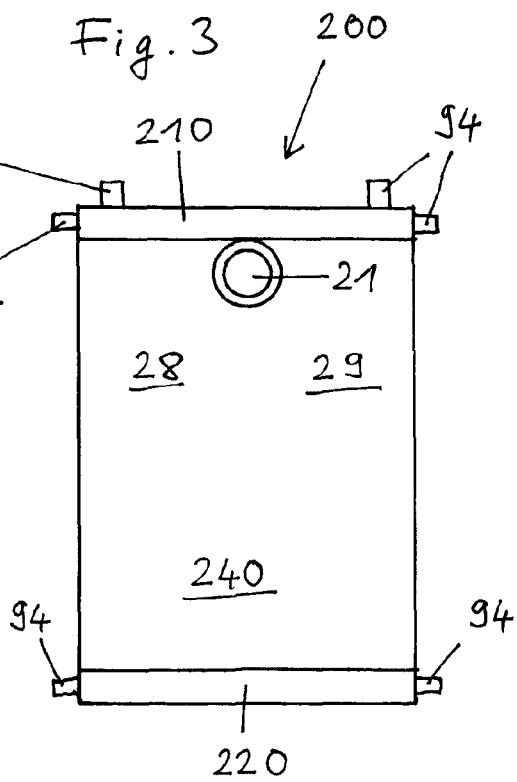

OPTICAL SENSOR OPERATING ON THE TRANSIT TIME PRINCIPLE

FIELD OF THE INVENTION

The present invention relates to an optical sensor operating on the transit time principle.

RELATED ART

A generic optical sensor is described in EP 1 378 763 A1, for example, and it comprises the following components. A light source for emitting emergent light pulses into an observed region, a rotating device for rotating the path of the beam of emergent light pulses about a rotation axis oriented transversely to the direction of said beam, a detector for detecting light pulses reflected by objects in the observed region, and a control and evaluation unit for controlling the light source, for evaluating the light pulses detected by the detector, and for determining the distance away of an object on the basis of the measured transit time of the light pulses.

Since the emergent light beam rotates and lasers are usually employed as light sources, such devices are also referred to as laser scanners, laser radars, or two-dimensional laser measuring devices. Sensors of this type have hitherto been mainly used in industrial applications for a plurality of different tasks. A basic prerequisite for this purpose is a comparatively clean environment, since excessively high levels of pollution or dirt or weather conditions such as rain or snow render the sensor incapable of making measurements.

Generic devices are used for navigation of, for example, forklift trucks, said navigation being frequently carried out with the aid of reflectors or absorbers mounted at defined locations in the environment. Navigation is basically also possible without reflectors, but here again, the respective conditions of the environment must be read into the evaluation unit in a learning phase.

Additional possible applications exist for tasks in the field of obstacle detection, safety of buildings, personal protection, volumetric measurement of objects, and thus basically all problems relating in some way to the detection of object contours.

Sensors of the type described above are known per se and they differ from each other mainly with respect to operating range, scanning range, and the respective method used for processing the measured data. One particularly important difference is that the scanning range in the known devices is either approximately 180° or approximately 360°.

In the two-dimensional optical sensor of the type described in EP 1 378 763 A1, a rotating mirror is used in order to reflect the laser beam into a measurement plane. The laser radiates in the rotation axis and the receiver receives, in the same axis, the laser light reflected by an object. In the ideal case, the light is reflected by the mirror inclined at 45° through exactly a right angle toward the observed region, that is to say, the measurement plane, and from the observed region toward the receiver, respectively.

However, since these arrangements always show slight mechanical misalignments, referred to as residual optical errors, the angle of incidence of the laser light on the mirror is not the same for all rotary positions of the mirror. The rotating laser beam therefore gyrates about a plane extending at right angles to the rotation axis of the mirror. The beam is then said to exhibit a gyration error. The mounting of the mirror is, in general, the greatest handicap to solving this problem. If the mirror is mounted at the bottom of the mechanical assembly, it is still difficult to cause the laser light to radiate in the rotation axis toward the mirror. On the other hand, if the mirror is mounted and suspended at the top, problems arise concerning the mounting and arrangement of the drive system as a whole since this must generally be carried out using a boom-like assembly. In so doing, a blind spot occurs at the location of the boom-like system where the electrical supply line and the mechanical retaining means for the motor extend vertically upwardly, and sensors of this design are not capable of all-round measurement, that is to say, they cannot scan the environment over the full range of 360°.

SUMMARY OF THE INVENTION

The present invention provides an optical sensor operating on the transit time principle, which can achieve a scanning range of 360°.

The optical sensor of the type described above is developed, according to the invention, in that the rotary device comprises a rotor and a stator and that the light source, the detector, and an electronic assembly forming part of the control and evaluation unit are mounted for joint rotation on the rotor.

The present invention arranges the light source and the detector such that, unlike the prior art, they are in a fixed relationship to each other and can rotate together. Since the light source and the detector rotate concurrently in a fixed system, no gyration error can occur. This constitutes a first advantage of the invention.

Another advantage is that the hitherto existing difficulties with regard to the drive no longer occur. Irrespective of where the rotor is driven, it does not disturb the measuring system in any way and the possibility of a blind spot no longer holds, since no electrical or mechanical components need to be mounted above the measuring system.

A further improvement consists in that, since both the light source and the detector are positioned on the rotor, very compact superstructures can be achieved and, in particular, long optical paths are obviated. The optical paths can be significantly shortened as compared with known systems comprising separately rotating mirrors and spatially fixed transmitters and receivers. In addition, much less overall installation space is required and the entire device can thus be produced with smaller dimensions.

As a result of the compact construction, air turbulence during rotation is additionally reduced and higher speeds of rotation are thus possible.

In principle, the light pulses reflected from the observed region can be guided and focused onto the detector with the help of lenses. In a variant of the sensor of the invention, a mirror that is likewise mounted on the rotor is present as the optical means for guiding the light pulses reflected by objects in the observed region onto the detector.

On the one hand, this is possible using very lightweight components and on the other hand, large numerical apertures and thus good light intensities can be achieved with the aid of a mirror, while keeping down the weight.

A concave mirror can be used as the mirror, with particularly good focusing properties being possible with the use of a parabolic mirror. For this purpose, a component of low weight can be achieved if the concave mirror is a molded plastic part provided with a coating.

In general, in the optical sensor of the invention, the components are formed such that they are as light in weight as possible and are additionally disposed as close as possible to the rotation axis, that is to say, with minimum moment of inertia. Higher rotation speeds and thus higher scanning rates of the environment are then more readily obtainable.

Rotation frequencies of significantly more than 50 Hz, that is to say, speeds greater than 3000 rpm can be achieved with the aid of the device described herein.

For the purpose of achieving a rotative drive, a permanent magnet is advantageously disposed on the rotor, which permanent magnet can be driven by coils disposed on the stator. Here, the permanent magnet on the rotor acts in the manner of a rotor of an electric motor.

It is in principal possible to transfer electric energy via sliding contacts from the stator to the rotor. In an embodiment, however, the energy required for operating the light source, the detector, and the control and evaluation unit is transferred in a non-contacting manner from the stator to the rotor. This can be realized particularly advantageously, in another variant of the optical sensor of the invention by providing a transformer link between the stator and the rotor for transferring energy from the stator to the rotor. In principle, this transformer link can also be implemented for the transfer of information. For example, configuration data and/or control data can be transferred from the stationary part, i.e. the stator, to the moving part, i.e. the rotor, on which components of the control and evaluation unit are already present. Basically, low data rates are sufficient for this purpose.

In principle, the measurement data determined by the detector could also be transferred outwardly by electrical means. However, since large data volumes accumulate in so doing, it is particularly advantageous when an optical transmission path is formed between the rotor and the stator for transferring data from the rotor to the stator. In principle, the transmission path can be in this context one that enables data transfer in one direction only, namely from the rotor to the stator. For this purpose, at least one suitable light source such as a light emitting diode is provided on the stator, and the modulated signals of this light emitting diode are detected by one or more photodiodes suitably positioned on the stator. In principle, this optical transmission path can also be formed for bi-directional data exchange, in which case at least one light source and at least one photodetector then must be provided at both ends of said path.

Such an optical transmission path can be realized on the rotation axis of the rotor in a particularly elegant and inexpensive manner.

In order to protect the rotor, which rotates very rapidly during operation and comprises the optical and electronic components, and the stator from external influences, particularly from contamination and mechanical impact, and in order to additionally eliminate the hazard posed to persons by the rotating parts, the rotor and the stator are advantageously accommodated in a housing that is stationary in relation to the stator.

Theoretically, it is possible to leave those regions open through which the emergent light pulses pass outwardly and the light pulses reflected by objects in the observed region pass back toward the detector, so that light can pass therethrough in both directions unhindered. However, since contaminations might reach the sensor interior through such open regions, which would additionally be a source of danger to the operator, in an embodiment the housing is mainly kept closed such that it has a partitioning screen, more particularly one enclosing an angle of 360°. By the term "transparent" is meant, in the present case, that the respective regions are transparent to the light emitted by the light source. This need not necessarily mean that the sensor interior is visible from outside. For example, when the light source used is a red laser, the transparent region can be a surrounding region of red plastics material that is transparent to the wavelength of the laser.

With optical sensors of this type it is necessary to ensure that the beam leaving the light source, for example the laser beam, does in fact reach the object it is desired to detect. If the laser beam is damped excessively or possibly fails altogether, this must necessarily be detected by the detector and made known to an operator or a higher-level control system, since otherwise the situation might arise that erroneously no object is detected even though one or more objects may in fact be present in the observed region. The functional efficiency of the laser itself can be monitored effectively. Another task relates to the case in which the laser light, as in the case described above, has to pass through an optical window, such as the aforementioned partitioning screen of the housing, and this partitioning screen or optical window, also referred to as a transparent region, does not have the necessary properties with respect to translucence. This can be the case when, for example, the partitioning screen is dirty, damaged, or, in particular, flawed or cracked. In order to ensure a proper functioning of the optical sensor, it is necessary to ensure that there is an adequate translucence of the partitioning screen. This is also referred to as translucence monitoring.

In the prior sensors, curved screens are used as partitioning screens, through which, due to suitable orientation of a light source and on account of the curvature, a test light beam passes twice, this beam being provided by light emitting diodes for example. The test light is caused to pass through the partitioning screen at several locations thereof to effect as thorough a test of the partitioning screen as possible. Nevertheless, a total test, in particular one covering the total transparent region or the entire partitioning screen, is not possible.

Such translucence monitoring is absolutely necessary for a reliable measuring, since the optical sensor will otherwise be unable to determine whether there is in fact no object present for detection or whether the light is fully absorbed by dirt on the partitioning screen resulting in the failure to detect any object actually present.

The partitioning screen can, in particular, be a surrounding element. That is to say, it extends over the full rotating or scanning range of 360°.

In variants of the optical sensor of the invention, there is thus provided, for the purpose of testing the translucence of the partitioning screen, at least one test detector disposed on the rotor. The test detector is oriented toward those throughput regions of the partitioning screen through which the emergent light pulses and/or the reflected light pulses pass. A test light source is present for providing the test light being likewise disposed on the rotor as an additional part of the test device, and at least one reflector element, to which the test light is directed, is disposed outside the housing, and the test detector is suitably positioned for detecting test light reflected by the reflector element.

In an embodiment, a test detector is no longer positioned such that it is stationary, as in the prior art, but is instead mounted on a rotatable rotor in the interior of the sensor.

It may be considered as being an advantage of the present embodiment that continuous and, in particular, rotary control and monitoring of the throughput region of the partitioning screen is possible with the aid of the rotating test detector.

A particularly large area of the front screen can be tested with respect to translucence in a variant of the optical sensor of the invention in which the test light is emitted from the sensor interior out through a first region of the partitioning screen, and the test light reflected by the reflector element passes back into the sensor interior through a second region of the partitioning screen, which second region is different from the first region. Both the properties of the first region of the partitioning screen and the properties of the second region of the partitioning screen are then included in the signal actually being measured by the test detector so that this measurement method is sensitive to both regions. The levels of the first and second regions can be offset in relation to each other, for example, so that the respective beams are at different distances from the rotation axis, that is to say, the center of rotation. This can also be referred to as a centric offset.

These measures can significantly increase the operational reliability of the optical sensor of the invention.

A circular annular mirror or segments thereof can be used as the reflector element.

The centric offset described above can be realized in a particularly elegant manner by the use of a reflector element which consists, in particular, of a circular annular profile of triangular cross-section, or segments thereof, made of a transparent material. The test light beam is deflected by said triangular profile, as in the case of a beam deflector basically known from the field of optics, by internal reflection.

In order to distinguish portions of the test light reflected by the reflector element from portions of extraneous light, the test light source can be pulsed.

In principle, in order to achieve the most thorough examination of the translucence of the partitioning screen, a number of test light sources and/or a number of test detectors assigned thereto can be provided in, say, diametrically opposed regions of the rotor.

In order to achieve the best possible translucence of the partitioning screen, it is advantageous to provide means for broadening the beam emerging from the test light source. Since the test light source and the test detector both rotate, the beam from the test light source does not need to be broadened or expanded in the direction of rotation, but only in a direction extending at right angles thereto. Therefore, the use of asymmetrical or cylindrical lenses can be advantageous for this purpose.

In a further variant of the optical sensor of the invention, the reflector element is mounted below an overhang of the housing and is thus protected particularly effectively from mechanical damage and/or contamination by dirt.

A particularly compact construction and a very good paraxial arrangement of the different components is made possible, in an additional embodiment of the invention, when the accommodating means, in which the light source, the detector, the test light source, the test detector and/or at least one electronic assembly as part of the control and evaluation unit are held, are formed in the molded plastic part in which the mirror is formed.

A particularly compact setup of the rotating parts is achieved when, for holding of circuit boards of the electronic assembly a molded plastic part is provided which is mounted on the rotor. In an embodiment, the contour of a concave mirror is formed at the molded plastic part.

In an effort to reduce, as far as possible, stray or scattered light in the interior of the sensor housing a tube can be formed at the molded plastic part, in which tube the light source is positioned in sunk-in way.

A mechanically more stable and, at the same time, simpler setup can be realized when the molded plastic part has an upper plate and a lower plate.

The tube in which the light source is received can, in a simple manner, be formed at the upper plate or at the lower plate.

In an effort to focus the light of the light source, a lens can be positioned in the tube.

With respect to the geometrical or spacial positioning of the molded plastic part on the rotor it is preferred when the molded plastic part is positioned in such a way on the rotor that a rotation axis of the rotor, for enabling a balanced rotation, pushes centrally through the molded plastic part, in particular centrally through the concave mirror. For balancing purposes, there can be soldering pads on which solder can be put in case this is necessary.

The mechanical setup can be facilitated when, at the upper plate and/or at the lower plate, mounting means are provided for mounting of the at least one circuit board. These mounting means can be, for example, pins which are formed at the molded plastic part, and which in the mounted state engage in corresponding holes in the circuit board. These pins can, for completing the assembly, be thermally compressed and thickened. This way, altogether, a setup is achieved which can be dismounted only in a destructive manner. For example each circuit board can be fastened with four pins.

A good stability can be achieved with simple means, when the circuit boards mounted to the molded plastic part are soldered to other circuit boards.

With respect to mechanical stability an assembly is used in which a cuboid setup is formed by the molded plastic part with the circuit boards mounted to it. By way of the cuboid setup the centrifugal forces appearing due to the rotation and which can amount to 300 times the gravitational forces are absorbed particularly well. The upper and/or the lower plate, in this connection, preferably have a rectangular shape.

Furthermore the optical components are mechanically stabilized by the molded plastic part, in particular when the cuboid setup is realized, whereby the functional reliability of the sensor is increased.

BRIEF DESCRIPTION OF THE DRAWINGS

Additional advantages and features of the optical sensor of the invention are described below with reference to the accompanying figures.

FIG. 2 shows a side view of a molded plastic part for a sensor according to the invention.

FIG. 3 shows a front view of the molded plastic part of FIG. 2.

FIG. 4 shows a top view of the molded plastic part of FIG. 2.

DETAILED DESCRIPTION OF THE INVENTION

Figure 1:
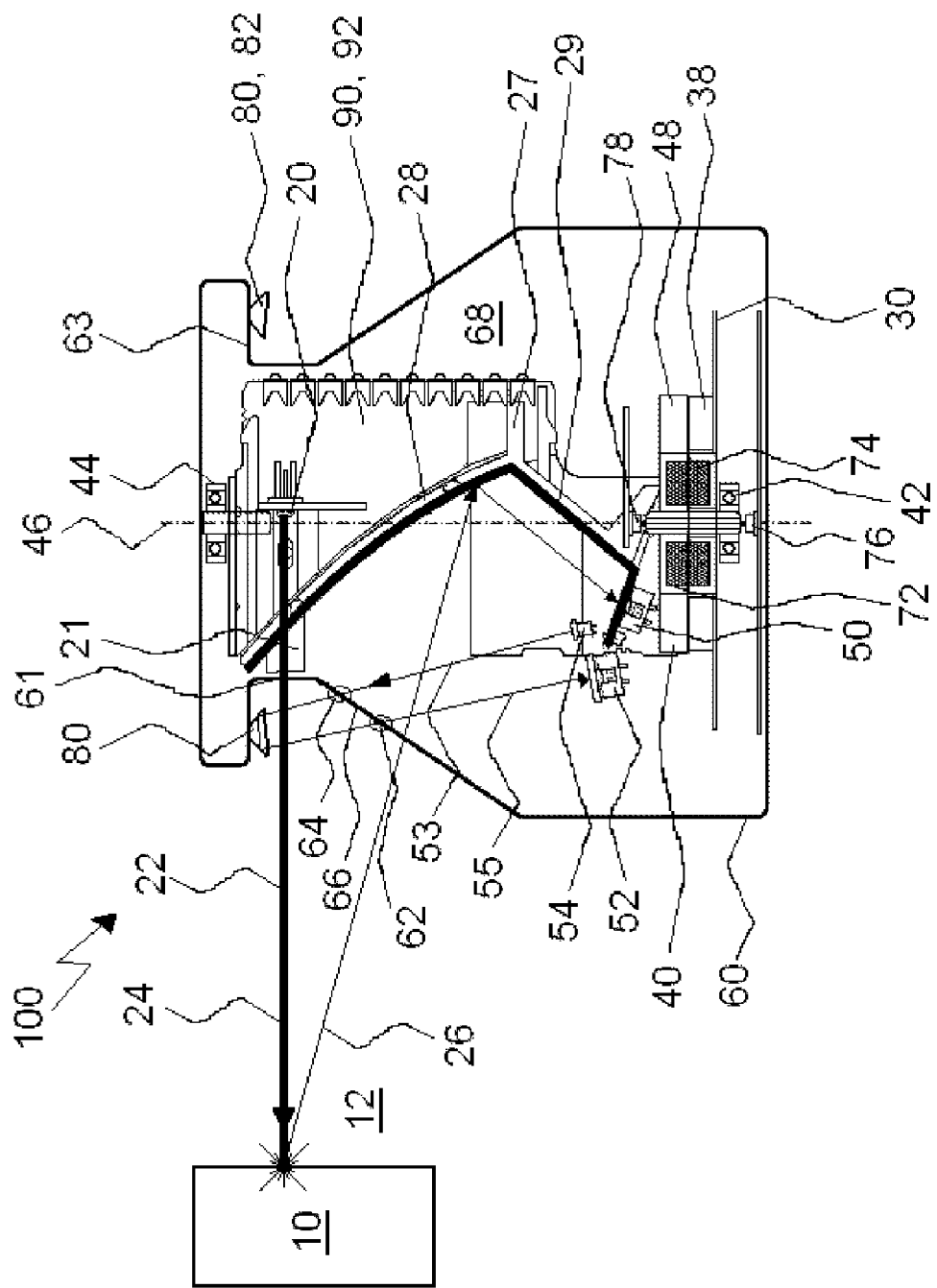
FIG. 1 shows an exemplary embodiment of an optical sensor of the invention.

An exemplary embodiment of an optical sensor 100 of the invention is described in detail with reference to FIG. 1. The optical sensor 100 of the invention, shown diagrammatically in the drawing, includes: a light source 20, a detector 50 and an electronic assembly 92 which is part of a control and evaluation unit 90. Furthermore, a concave mirror 28 is provided that is formed by a coating 29 on a molded plastic part 27. The light source 20, the detector 50 and the electronic assembly 92 are also accommodated in this molded plastic part 27 with the aid of suitable retaining means not shown in detail in FIG. 1.

The molded plastic part 27 with the components disposed thereon is mounted on a rotor 40 adapted to rotate in relation to a stator 30. The entire structure is accommodated in a housing 60 having a bottle-shaped profile, the rotor 40 being capable of rotating on ball bearings 42, 44 relatively to a rotation axis 46. To the rotor 40 there is also fixed a permanent magnet 48 which can be driven in the manner of an electric motor by means of coils 38 disposed on the stator 30. A transformer link is formed by coils 72, 74 in order to transfer energy from the stator 30 to the rotor 40. Basically, e.g.

configuration data and/or control data can be transferred to the light source 20, the detector 50, and/or the electronic assembly 92 by way of this transformer link, albeit at a comparatively low data rate.

The housing 60, which may also be referred to as a hood, is used firstly for the purpose of keeping a sensor interior chamber 68 separate from the environment and, in particular, of protecting the same from contamination and mechanical damage. An additional purpose of the housing 60 is to protect operators from the hazard posed by the rotor 40 rotating at high speed, for example at a speed of more than 3000 revolutions per minute.

An optical transmission path disposed axially, that is to say, along the rotation axis 46, is formed by a light emitting diode 78 and a photodiode 76 for the transfer of data from the rotating part to the stator. The data rate across the optical transmission path from the rotor to the stator is, for example, 100 MBaud.

The housing 60 comprises a partitioning screen 66 that may also be referred to as a transparent region. The partitioning screen 66 need not be a separate component, but can be formed as an integral part of the housing 60, as in the example illustrated. In an embodiment, the housing 60 is transparent to the wavelengths used, at least in an outlet region 61, in which light pulses 22 from the light source 20 have to pass in an outward direction, and additionally in regions 62, 64, in which light pulses 26 reflected by an object 10 have to pass back into the sensor interior 68. In the example illustrated, a laser diode is used which emits at 660 nm, i.e. in the dark red range.

In order to ensure that the partitioning screen 66 is sufficiently clean, that is to say, that it provides a sufficient light translucence, a test light source 54, which is a light emitting diode in the example illustrated, and a test detector 52 are additionally mounted on the rotor 40. The test light source 54 and the test detector 52 can in particular likewise be accommodated in retaining means formed in the molded plastic part 27. In principle, suitable optical means such as lenses can be provided for focusing the test light onto the test detector 52.

The test light source 54 is positioned such that emitted test light 53 passes through the partitioning screen 66 in a first region 64 and then impinges on a reflector element 80, by means of which it is reflected and radiated back toward the housing 60. The reflector element in the example illustrated is a circular annular profile 82 having a triangular cross-section and made of a transparent plastics material. As indicated diagrammatically in FIG. 1, the test light 53 is deflected by the reflector element 80 through 180° by double internal reflection, and the reflected test light 55 is slightly offset centrically outwardly, in accordance with the geometry of the reflector element 80. The reflected test light 55 re-enters into the sensor interior 68 through a second region 62 and then passes to the test detector 52, which is suitably positioned for this purpose so as to detect said test light 55.

When the surfaces of the partitioning screen 66 are dirty or the partitioning screen 66 is damaged, for example cracked or flawed, this state is detected by the test detector 52 on account of the reduced intensity of the test light. The intensity of the test light 53, 55 measured by the test detector 52 is evaluated in the control and evaluation unit 90 and when the measured intensities are below a specified threshold value, the measurement data obtained are no longer taken into account in the evaluation.

In order to prevent emergent light pulses 22 from impinging on the detector 50 in any other way than via reflection by an object 10, the light source 20 is countersunk in a tube 21 that is likewise molded on the molded plastic part 27.

An advantage of the optical sensor of the invention is that compact and, in particular, paraxial arrangements can be set up as a result of the light source, mirror, detector, and evaluation electronics being jointly disposed on the rotor. Air turbulence, which constitutes a limiting factor on the maximum rotation speeds achievable, can be reduced significantly by this unit consisting of the transmitter, mirror, receiver, and electronic assembly.

Another advantage of the variant described herein of the optical sensor 100 of the invention is that the front screen 66 can be monitored all around, in principle, over the entire angular range of 360°, since the test source 54, like the test detector 52, is disposed on the rotor 40 and both rotate concurrently during operation of the sensor 100. The first region 64 and the second region 62 each therefore coincide with different areas of the front screen 66, depending on the rotary position of the rotor 40. Another advantage is that the first region 64 and the second region 62 do not coincide and thus a particularly large area of the partitioning screen 66 is covered by the evaluation concerning possible contamination by dirt.

Finally, an advantage of the embodiment described herein of an optical sensor of the present invention is also that the partitioning screen 66 need no longer be provided with a curved shape. Since the light source 20 can be positioned virtually very close to an outlet region 61 of the housing 60, virtually no inner reflections can result in said outlet region 61 from the emergent light pulses 22. The possibility of backglare is therefore obviated. In particular, the partitioning screen 66 can be formed with a simple cylindrical shape.

A further detail of the optical sensor illustrated in FIG. 1 is that the circular annular profile 82 formed by the reflector element 80 is mounted below an overhang 63 of the housing 60 and thereby is particularly effectively protected from mechanical impact and thus from extraneously caused damage.

In principle, in the translucence monitoring process described herein, a test light beam is transmitted obliquely from the base or from the upper plane of the rotor through the substantially cylindrical outer partitioning screen that is also referred to as the transparent region. This beam impinges on the upper or lower part of the refection means such as the circular annular mirror or the circular annular profile and is reflected with a parallel offset. The partitioning screen is thus tested in two areas with respect to possible contamination by dirt. This means that the distance data measured are evaluated as being valid only if both regions through which the test light passes are sufficiently clean.

In an embodiment, the optical sensor of the invention operates as follows: The light source 20 basically operates like known laser pointers and emits, for example, per second 250,000 emergent light pulses 22 at a wavelength of 660 nm, that is to say, in the dark-red spectral range. With the aid of a collimator optics, not shown in detail, the emergent light pulses 22 are collimated to form a parallel bundle of rays. In the example illustrated, the emergent light pulses 22 are emitted in a beam direction 24 oriented at right angles to the rotation axis 46 of the optical sensor 100. When the emergent light pulses 22 impinge on an object 10 in the observed region 12, they are reflected by this object 10 in the form of light pulses 26 which pass back through the front screen 66 to the sensor interior 68 and onto the concave mirror 28 disposed therein. The detector 50 is positioned relative to the concave mirror 28 such that almost all of the reflected light pulses 26 can be detected by the detector 50.

The control and evaluation unit 90, which is not shown in further detail in FIG. 1 and, in particular, parts of which can also be disposed outside the housing 60, controls the light source 20, evaluates the light pulses 26 detected by the detector 50, and computes from the measured transit times a distance away of a detected object 10. By rotating the beam direction 24 of the emergent light pulses 22, the beam direction 24 is thereafter moved in a plane and the optical sensor 100 of the invention can in this way record a profile of its environment.

Higher rotation speeds are thus made possible, so that the respective environment can be detected at a greater measuring rate in navigation applications. This is particularly important for applications in which the devices or vehicles to be navigated or controlled move comparatively rapidly. If the scanned data coming from the environment were supplied only at a low rate, the position of the vehicle to be navigated would significantly change between any two measurements. The resulting effects are also known as spatial distortions. Theoretically, the latter can be back computed but this would necessitate additional sensors such as velocity sensors or angle-measuring sensors in the manner of a compass.

When use is made of the optical sensor of the invention, there is no need for these additional sensors in a number of applications on account of the increased speed of rotation, as a result of which considerable cost saving is possible.

A further possible application for the sensors of the invention is toll calculation in the field of traffic monitoring. An optical sensor of the invention could be mounted, for example, on a bridge to determine the profiles or contours of vehicles traveling under the bridge. Since these profiles of different vehicle types are in most cases very distinctive, it is thus possible to determine the point in time at which a certain vehicle type passed under the bridge in question.

The present invention describes a novel two-dimensional optical measuring sensor operating on the transit time principle and in which monitoring of the full range of rotation through 360° is realized in a particularly elegant manner. This is made possible by the fact that in the optical sensor no independently rotating mirror is provided, the retaining means for which would create a blind spot. In the optical sensor described herein, there is rotation of the complete scanning unit, that is to say, a unit including the light source, the detector, the mirror, and parts of the electronic measuring equipment. The energy required for the light source, the detector, and the electronic equipment is transferred in a non-contacting manner from the stator to the rotor, which is also referred to as a measuring head. Likewise, data is transferred from the rotor to the stationary part of the sensor, also referred to as the stator, in a non-contacting manner, in particular by way of an optical transmission route.

An embodiment of the molded plastic part which can be used in a sensor according to the invention will be described in connection with FIGS. 2 to 4.

There, a molded plastic part 200 is shown, which, in the mounted state, forms a cuboid setup together with circuit boards 93 of the electronic assembly 92.

Equivalent components carry the same reference numerals in all figures.

As essential components the molded plastic part 200 has an upper plate 210, a lower plate 220 and a contour 240 of a concave mirror formed between the upper and the lower plates 210, 220. A concave mirror 28 is formed by way of a coating 29 on the contour 240.

At the upper plate 210 a tube 21 is formed in which tube 21 the light source 20 is situated. By way of the sunk-in positioning of the light source 20 in the tube 21 the amount of stray or scattered light in the interior of the sensor according to the invention is substantially reduced.

At the upper plate 210 and at the lower plate 220, in each case, are formed laterally protruding pins 94. These pins 94 serve the mounting of circuit boards 93 of the electronic assembly 92. This is shown in diagrammatical manner in FIG. 4. There, two circuit boards 93 are fastened facing each other at the molded plastic part 200 and the pins 94 engage through holes which are formed in the circuit boards 93 at the respective positions.

The invention claimed is:

1. An optical sensor based on the transit time principle, comprising:
    a light source for emitting emergent light pulses into an observed region;
    a rotating device for rotating a beam direction of the emergent light pulses about a rotation axis orientated at right angles to the beam direction;
    a detector for detecting light pulses reflected by objects in the observed region; and
    a control and evaluation unit for controlling the light source, for evaluating the light pulses detected by the detector, and for determining a distance of an object using a measured transit time of the light pulses;
    wherein the rotating device includes a rotor and a stator, and wherein the light source, the detector, and an electronic assembly forming part of the control and evaluating unit are disposed for joint rotation on the rotor;
    wherein between the stator and the rotor there is provided a transformer link for transferring energy from the stator to the rotor.

2. The sensor as defined in claim 1, wherein a mirror disposed on the rotor guides light pulses reflected by objects in the observed region to the detector.

3. The sensor as defined in claim 1, wherein the rotor includes a permanent magnet capable of being driven by coils located on the stator.

4. The sensor as defined in claim 1, wherein for transfer of data from the rotor to the stator there is provided an optical transmission route between the rotor and the stator.

5. The sensor as defined in claim 4, wherein the optical transmission route is formed on the rotation axis of the rotor.

6. The sensor as defined in claim 2, wherein the mirror is a concave mirror.

7. The sensor as defined in claim 2, wherein the mirror is a parabolic mirror.

8. The sensor as defined in claim 2, wherein the mirror comprises a molded plastic part provided with a coating.

9. The sensor as defined in claim 1, wherein the rotor and the stator are accommodated in a housing which is stationary in relation to the stator; and the housing includes a partitioning screen which is transparent to the emergent light pulses and to the reflected light pulses.

10. The sensor as defined in claim 9, wherein the partitioning screen is a fully surrounding partitioning screen.

11. The sensor as defined in claim 9, wherein for testing an optical translucence of the partitioning screen, at least one test detector is provided which is disposed on the rotor;
    the test detector is oriented toward throughput regions of the partitioning screen through which the emergent light pulses and/or the reflected light pulses pass;

the test light is provided by a test light source, which is disposed on the rotor;

outside the housing at least one reflector element is provided to which the test light is directed; and the test detector is positioned such that it can detect the test light reflected by the reflector element.

12. The sensor as defined in claim 11, wherein the test light passes outwardly from an interior of the sensor through the partitioning screen in a first region thereof; and the test light reflected by the reflector element passes inwardly to the interior of the sensor through the partitioning screen in a second region thereof which differs from the first region.

13. The sensor as defined in claim 11, wherein the test light source is adapted for pulsed operation.

14. The sensor as defined in claim 11, wherein the reflector element is a circular annular mirror, or a circular annular profile having a triangular cross-section.

15. The sensor as defined in claim 11, wherein the reflector element comprises a transparent plastics material.

16. The sensor as defined in claim 11, wherein the reflector element is mounted below an overhang of the housing.

17. The sensor as defined in claim 1, wherein a molded plastic part accommodates at least one of: the light source, the detector, the test light source, the test detector, and the electronic assembly.

18. The sensor as defined in claim 1, wherein for holding of circuit boards of the electronic assembly a molded plastic part is provided which is mounted on the rotor.

19. The sensor as defined in claim 18, wherein at the molded plastic part a contour of a concave mirror is formed.

20. The sensor as defined in claim 18, wherein a tube is formed at the molded plastic part in which tube the light source is positioned in a sunk-in way.

21. The sensor as defined in claim 18, wherein the molded plastic part has an upper plate and a lower plate.

22. The sensor as defined in claim 21, wherein the upper plate and the lower plate are rectangular.

23. The sensor as defined in claim 21, wherein the tube is formed at the upper plate or at the lower plate.

24. The sensor as defined in claim 20, wherein in a tube a lens is positioned for focusing the light from the light source.

25. The sensor as defined in claim 19, wherein a rotation axis of the rotor, for enabling a balanced rotation, centrally pushes through the molded plastic part.

26. The sensor as defined in claim 25, wherein the rotation axis of the rotor pushes centrally through the concave mirror.

27. The sensor as defined in claim 21, wherein at the upper plate and/or at the lower plate a mounting assembly is provided for mounting the at least one circuit board.

28. The sensor as defined in claim 18, wherein the circuit boards mounted to the molded plastic part are soldered to further circuit boards.

29. The sensor as defined in claim 18, wherein a cuboid setup is formed by the molded plastic part and the circuit boards mounted to the molded plastic part.

* * * * *